United States Patent [19]

Miller

[11] 4,098,138

[45] Jul. 4, 1978

[54] DRIVE DISCONNECT DEVICE

[75] Inventor: Calvin L. Miller, Aurora, Ill.

[73] Assignee: Caterpillar Tractor Co., Peoria, Ill.

[21] Appl. No.: 805,939

[22] Filed: Jun. 13, 1977

[51] Int. Cl.$^2$ ............................................. F16H 57/00
[52] U.S. Cl. ..................................................... 74/405
[58] Field of Search ............................................. 24/405

[56] References Cited

U.S. PATENT DOCUMENTS

| 3,504,563 | 4/1970 | Polak | 74/405 |
|---|---|---|---|
| 3,504,564 | 4/1970 | Kell | 74/405 |
| 3,835,722 | 9/1974 | Bertram et al. | 74/405 |
| 3,949,823 | 4/1976 | Herr, Jr. | 74/405 X |
| 4,041,792 | 8/1977 | Miller | 74/405 |

*Primary Examiner*—Leonard H. Gerin
*Attorney, Agent, or Firm*—John W. Grant

[57] ABSTRACT

A power train is contained within a housing and has first and second rotary members. The first member is movable between a first position at which the first and second members are engaged to transmit power therebetween and a second position at which the first member is disconnected from the second member. A threaded bore is formed in the housing in axial alignment with the first member. A drive disconnect device includes a cylindrical cage having an outer surface, an external thread and first and second grooves formed in the outer surface. The first groove is axially spaced from the second groove. The external thread is threadably positionable within the threaded bore with the cage being rotatably connected to the first member. The cage is of a construction sufficient for moving the first member from the second position to the first position in response to the cage being rotated in a first direction and for moving the first member from the first position to the second position in response to the cage being rotated in an opposite direction. A lock member is detachably connectable to the housing and is engageable with the first groove at the first position of the first member and is engageable with the second groove at the second position of the first member.

3 Claims, 3 Drawing Figures

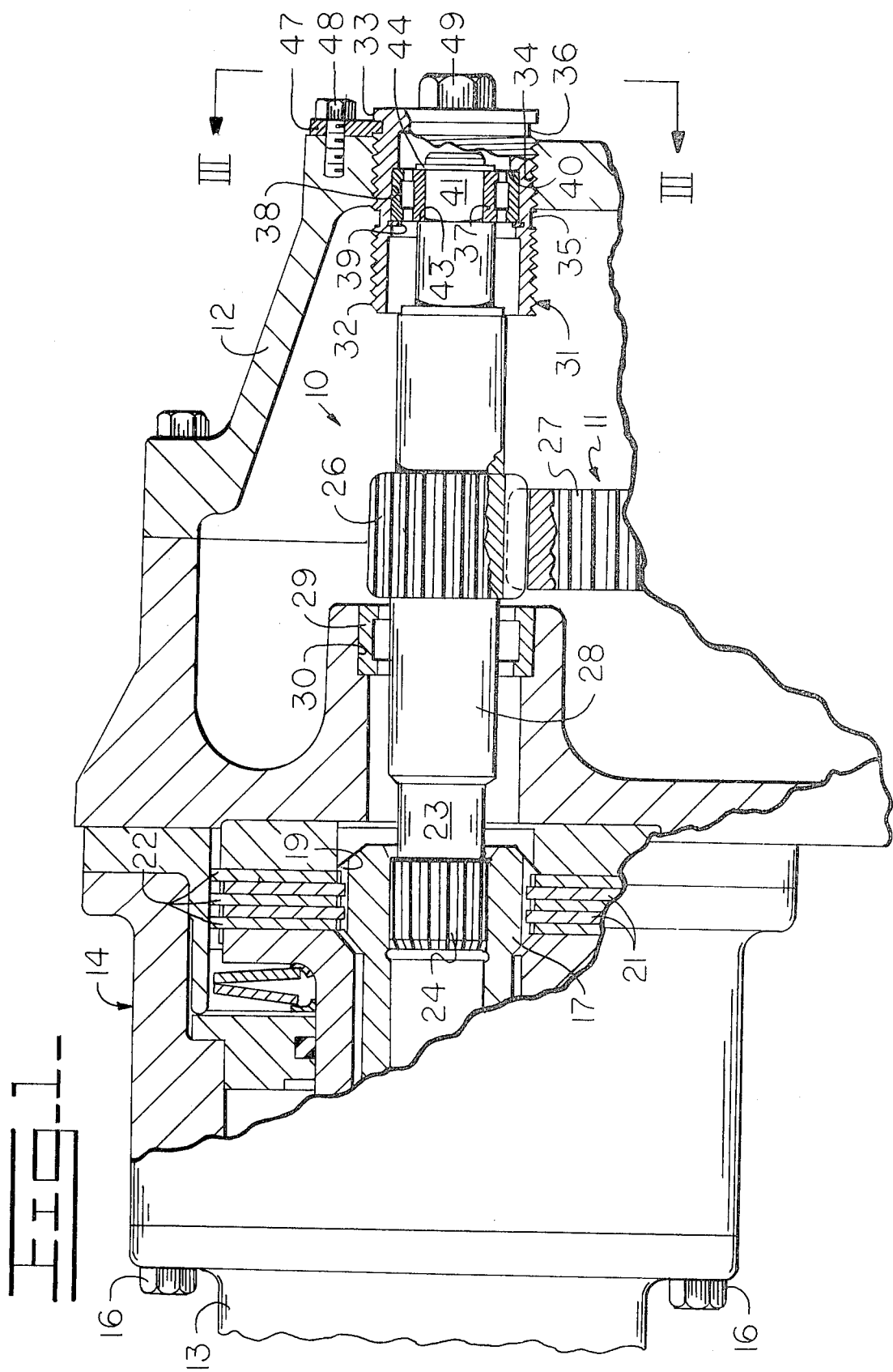

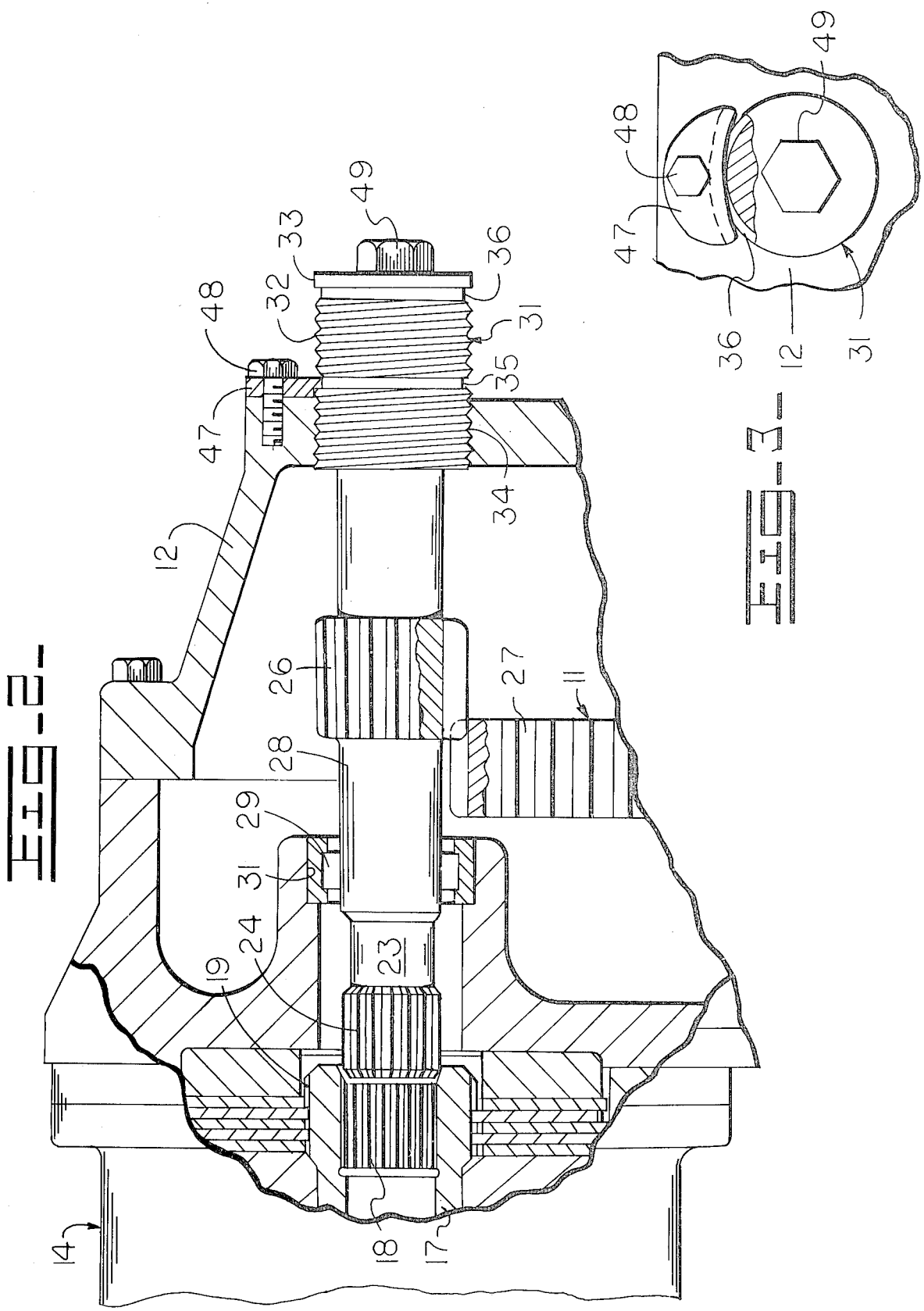

DRIVE DISCONNECT DEVICE

BACKGROUND OF THE INVENTION

It is frequently desirable to disconnect a final drive for a track-type vehicle when the vehicle is being towed. Although the transmission for the vehicle is normally placed in neutral during towing, hydrostatic motors sometimes employed in the vehicle's final drive remain operatively connected to the drive sprockets or the tracks. Thus, the motors are driven by the sprockets during towing which may result in damage to the motors due to lubricant starvation and frictional drag occasioned between the rotating components thereof.

In addition, a normally engaged and hydraulically released brake is usually integrated into the final drive. Since the vehicle's power plant may be nonoperative during the towing, the brake can not be released hydraulically unless special release mechanisms are employed therefor.

The present invention is directed to overcoming one or more of the problems as set forth above.

According to the present invention, there is provided a drive disconnect device for a power train contained within the housing and having first and second rotary members said first member being movable between a first position at which said first and second members are engaged to transmit power therebetween and a second position at which the first member is disconnected from the second member. The housing has a threaded bore in axial alignment with the first member. The drive disconnect drive comprises a cylindrical cage having an outer surface, an external thread and first and second grooves formed in the outer surface, said first groove being axially spaced from the second groove and said external thread being threadably positionable within the threaded bore. The cage is rotatably connected to the first member and is of a construction sufficient for moving the first member from the second position to the first position in response to the cage being rotated in a first direction and for moving the first member from the first position to the second position in response to the cage being rotated in an opposite direction. A lock member is detachably connectable to the housing and is engageable with the first groove at the first position of the first member and is engageable with the second groove at the second position of the first member.

BRIEF DESCRIPTION OF THE DRAWINGS

FIG. 1 is a sectional view of the drive disconnect device embodying the principles of the present invention as shown in the engaged position.

FIG. 2 is a sectional view of the drive disconnect device in the disengaged position.

FIG. 3 is an elevational view of one end of the drive disconnect device as viewed along line III—III of FIG. 1.

DETAILED DESCRIPTION

Referring to FIG. 1 of the drawings, a drive disconnect device embodying the principles of the present invention is generally illustrated by the reference numeral 10 connected to a final drive, partially shown at 11, employed in a power train for a track-type vehicle, not shown. The drive disconnect device and final drive are contained in a common housing 12. A hydrostatic motor, partially shown at 13, and a normally engaged brake assembly 14 are attached together and to the housing by a plurality of circumferentially disposed bolts 16. The motor may be selectively actuated by hydraulic control means (not shown) to supply input power to the final drive through an input or drive sleeve 17 and the disconnect device. The sleeve is provided with internal splines at 18 and external splines at 19. The brake assembly, normally spring engaged and adapted to be hydraulically released in the usual manner, includes a plurality of rotatable friction discs 21 mounted for limited axial movement on the external splines 19. A plurality of nonrotatable friction discs 22 are alternately interleaved with the friction disc 21 and cooperate therewith to hold the drive sleeve stationary when the brake is engaged. When the brake is released hydraulically, the drive sleeve is permitted to rotate.

An elongated output or driven shaft 23 is in axial alignment with the drive sleeve 17 and is provided with external splines 24 on one end and which normally meshes with the internal splines 18 of the drive sleeve. A spur gear 26 is formed on the driven shaft and meshes with a spur gear 27, partially shown at 27. The spur gear 27 is one of the gears making up the gear train of the final drive. A smooth bearing surface 28 is formed on the driven shaft between the external spline 18 and the spur gear and is rotatably supported in a roller bearing 29 suitably seated in a bore 30 formed in the housing 12.

A hollow cylindrical cage 31 has an external thread 32 formed on its outer surface 33 and threadably extends through a threaded bore 34 formed in the housing 12 in axial alignment with the driven shaft 23 and the drive sleeve 17. A pair of axially spaced annular grooves 35 and 36 are formed in the outer surface. A roller bearing 37 is seated in a bore 38 formed in the cage and retained therein at a fixed axial position relative to the cage by a snap ring 39 seated in an annular groove formed in the cage and an annular shoulder 40 at the end of the bore 38. A reduced diameter bearing portion 41 is formed on the opposite end of the driven shaft and is rotatably supported by the roller bearing 37. An annular shoulder 43 formed on the driven shaft is maintained in abutment with the bearing by a snap ring 44 seated in an annular groove formed in the shaft. Thus, the driven shaft is fixed axially relative to the cage while the shaft may freely rotate relative to the cage or vice versa.

A lock member 47 is detachably connected to the housing 12 by a bolt 48 and extends into the groove 36 at the engaged position of the driven shaft as shown in FIG. 1 and into the groove 37 at the disengaged position of the driven shaft. The lock member functions to maintain the cage and hence the driven shaft in the selected position.

During vehicle operation, the driven shaft 23 is positioned as shown in FIG. 1 to continuously maintain internal splines 18 and external splines 24 in meshed relationship. The hydrostatic motor 13 functions to selectively drive the drive sleeve 17 which in turn drives the driven shaft 23 such that the spur gear 26 drives the spur gear 27 of the final drive.

As shown in FIG. 2 when it is desirable to tow the vehicle to a service facility, for example, the driven shaft 23 is shifted to a second or disengaged position to disengage the external splines 24 of the driven shaft from the internal splines 18 of the drive sleeve 17. Such disengagement interrupts the drive train to prevent the final drive from imparting rotation to the drive sleeve 17, brake assembly 14 and hydrostatic motor 13. Such disengagement is accomplished by first removing the lock member 47 and then rotating the cage 31 in a first direction with an appropriate tool fitted on a multi-sided protuberance 49 provided on the end of the cage. Upon rotation of the cage the threaded connection between the cage and the housing 12 causes the cage to move axially and simultaneously moves the driven shaft 28 in an axial direction to the right to disengage the external splines 24 from the internal splines 18. The cage is rotated until the groove 37 is in position to receive the lock member 47 thereby establishing the second position of the driven shaft. The spur gear 26 remains partially engaged with the spur gear 27 at the second position of the driven shaft.

When it is desired to reenegage the external splines 24 with the internal splines 18 from the disengaged position shown in FIG. 2, the lock member 47 is again removed, the cage is rotated in the opposite direction so that the cage and driven shaft 23 are moved in an axial direction to the left until the internal splines 18 are fully engaged with the external splines and the groove 36 is in position to receive the lock member. The lock member 47 is then secured in place with the bolt 48 to maintain the cage in its fixed position with the drive disconnect in the engaged position.

While the invention has been described and shown with particular reference to the preferred embodiment, it will be apparent that variations might be possible that would fall within the scope of the present invention, which is not intended to be limited except as defined in the following claims.

The embodiments of the invention in which an exclusive property or privilege is claimed are defined as follows:

1. A drive disconnect device for a power train contained within a housing and having first and second rotary members, said first member being movable between a first position at which said first and second members are engaged to transmit power therebetween and a second position at which the first member is disconnected from the second member, and said housing having a threaded bore in axial alignment with the first member, said drive disconnect device comprising:
   a cylindrical cage having an outer surface, an external thread and first and second grooves formed in the outer surface, said first groove being axially spaced from said second groove, said external thread being threadably positionable within the threaded bore, said cage being rotatably connected to the first member and being of a construction sufficient for moving the first member from the second position to the first position in response to the cage being rotated in a first direction and for moving the first member from the first position to the second position in response to the cage being rotated in an opposite direction; and
   a lock member detachably connectable to the housing and being engageable with the first groove at the first position of the first member and being engageable with the second groove at the second position of the first member.

2. The drive disconnect device of claim 1 including a first annular portion on the first member, a bore in the cage, and a bearing seated on the first annular portion and being connected to the first member, said bearing being positioned within the bore and connected to the cage.

3. The drive disconnect device of claim 2 including an external spline formed on the first member and an internal spline formed on the second member, said external spline being engaged with the internal spline at the first position of the first member and being disconnected from the internal spline at the second position of the first member.

* * * * *